United States Patent Office 3,434,728
Patented Mar. 25, 1969

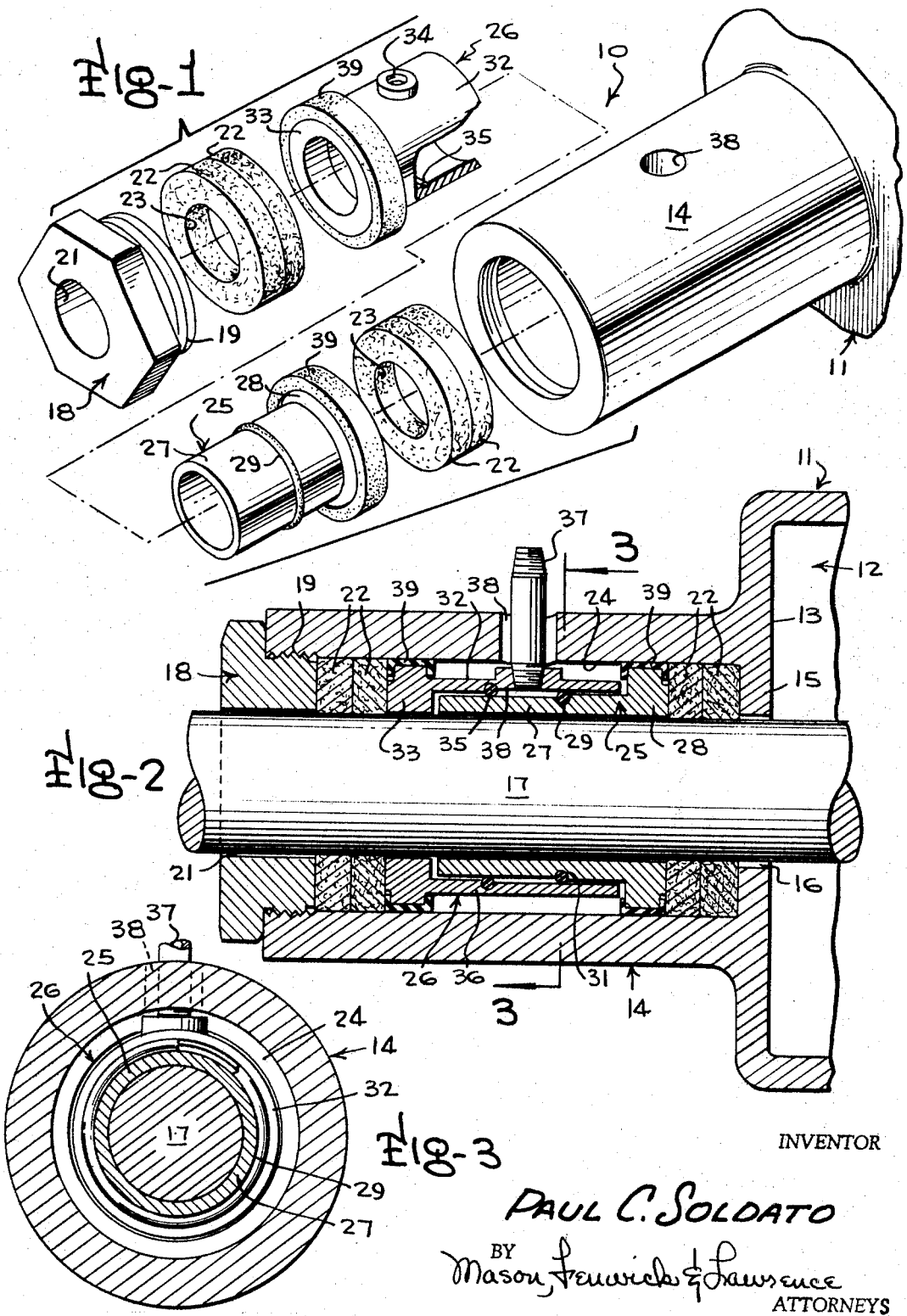

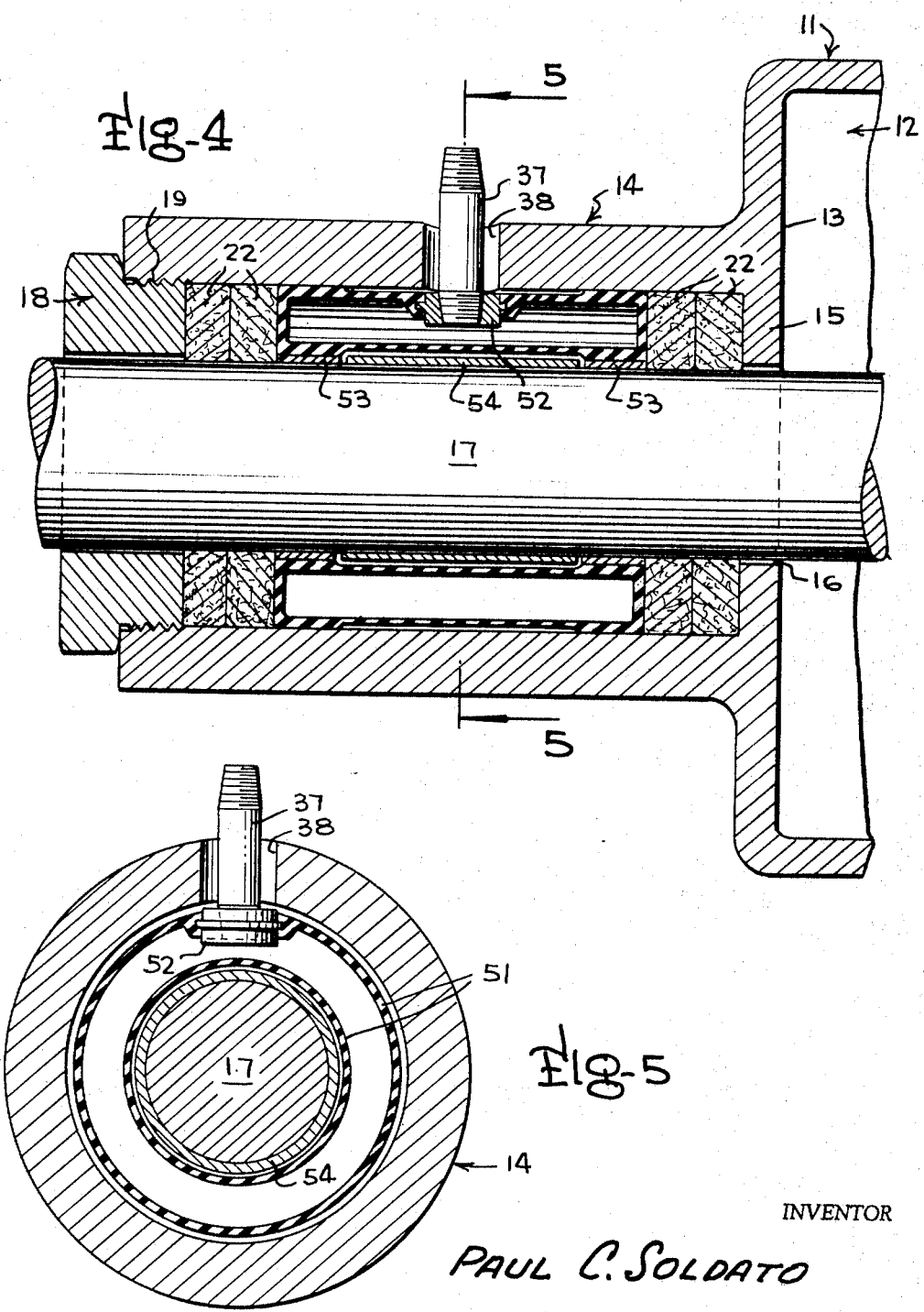

3,434,728
MEANS OF AUTOMATICALLY ADJUSTING
HYDRAULIC PNEUMATIC PACKINGS
Paul C. Soldato, Pittsfield, Mass.
(North Main St., Lanesboro, Mass. 01237)
Filed Sept. 26, 1966, Ser. No. 581,962
Int. Cl. F16j 15/40, 15/44; B65d 53/00
U.S. Cl. 277—59                                3 Claims

ABSTRACT OF THE DISCLOSURE

A rotary shaft seal having mating concentric sleeves surrounding the shaft and defining a sealed chamber so that pressurized fluid introduced into the chamber moves the sleeves axially apart to apply pressure to sealing elements mounted adjacent the ends of the sleeves.

---

This invnetion relates in general to a mechanical seal assembly, and more particularly to a device for holding pressures and preventing leakage in a multi-stage packing or stuffing box.

An object of this invention is to provide efficient means for preventing leakage in the glands and packing and stuffing boxes utilized in high-pressure application with or without relatively rotating parts.

Another object of this invention is the provision of a mechanical seal assembly which provides internal pressures within the stuffing box to form an effective seal against high pressures.

A further object of this invention is the provision of a mechanical seal which utilizes a fluid not only to maintain a positive pressure at the juncture point, but to control the lubrication of the packing glands between relatively rotatable members.

Still another object of the present invention is the provision of a mechanical seal assembly which is automatic in operation thereby eliminating the need for constant attention.

Yet another object of the present invention is the provision of a mechanical seal wherein fluid pressure in an annular chamber between the relative rotatable elements of the seal assembly is advantageously utilized for counterbalancing pressure acting across the radial faces of the mechanical seal elements.

Further aims, objects an advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

In the drawings:

FIGURE 1 is an exploded perspective view of the mechanical seal assembly of the present invention;

FIGURE 2 is a vertical section view taken along the longitudinal centerline of the mechanical seal assembly;

FIGURE 3 is a vertical section view taken along lines 3—3 of FIGURE 2;

FIGURE 4 is a vertical section view similar to that of FIGURE 2, however showing a second embodiment of the invention; and FIGURE 5 is a vertical section view taken along lines 5—5 of FIGURE 4.

Generally the present invention comprises a mechanical seal assembly through which passes a shaft which may, or may not be, rotatable, and which is designed to be properly sealed from a fluid reservoir by pressurized packing. Generally a recess is provided into which the fluid is admitted in order to place opposing pressure upon concentric cylinders which in turn act to apply pressure upon the sealing elements, thereby pressing the packing in the packing glands firmly against all joints to prevent the leakage from the fluid reservoir.

Referring to the drawings wherein like reference characters designate corresponding parts throughout the several figures, the mechanical seal assembly is generally indicated by the numeral 10. The seal assembly is confined within a housing 11 of any suitable configuration which in turn embodies a fluid reservoir 12 in communication with a housing wall 13. In the present invention the housing 11 has an outwardly extending cylindrical tube 14 having at the wall portion an annular inwardly extending flange 15 against which suitable sealing elements are pressed. An aperture 16 in the annular flange 15 allows a shaft 17 to extend from the fluid reservoir outwardly through, and concentrically with, tube 14.

Closing the free end of the tube 14 is a packing gland retaining nut 18 which is threadingly engaged with the tube 14 as indicated by numeral 19. The retaining nut 18 also has an aperture 21 through which the shaft 17 is adapted to project.

The internal construtcion of the mechanical seal assembly comprises a plurality of sealing elements shown as toroidal packing rings 22 having an aperture 23 which fits snugly against the shaft 17. In this particular instance, packing rings 22 are disposed within each end of the operating cavity 24 and, at one end, abut aagainst flange 15. At the other end of the cavity 24 the rings 22 abut against retaining nut 18.

In order that the packing rings 22 may be kept compressed the desired amount to prevent leakage of the fluid from the reservoir 12 along the shaft 17 or through other cavities there is provided a pair of concentric sleeves which are indicated by numeral 25 for the inner sleeve, and numeral 26 for the outer sleeve. Inner sleeve 25 comprises a generally tubular shaped member having a thin wall member 27 lying adjacent shaft 17. A flange 28 projects annularly outward from the shaft 17. Generally at the midpoint of the wall 27 of inner sleeve 25 is an O-ring 29 firmly engaged in a retaining recess 31.

The outer sleeve 26 comprises a cylindrical member having a configuration which embodies a thin cylindrical tubular wall 32 which, at one end, has an annular flange 33 extending both inwardly and outwardly with respect to the tube. Near the midpoint of the tubular wall 32 of the outer sleeve 26 is a threaded aperture 34. On the interior of the outer sleeve 26 and generally between the aperture 34 and flange 33 is an O ring 35 firmly engaged in recess 36. When properly in position, each of the O-rings 29 and 35 firmly engage the elongated tubular portion of the other respective sleeve. However, this engagement is only firm enough to prevent leakage of the pressurized fluid and not so firm as to prevent the longitudinal movement between the concentric sleeves.

Positioned within the aperture 34 is a fluid inlet pipe 37 through which is admitted the pressurized fluid which acts to keep the packing rings 22 in a compressed state. The suitable pressurized fluid is admitted through the pipe 37 into the pressure region 38 whence it acts upon O-rings 29 and 35 thereby causing longitudinal movement between the concentric sleeves since the admitted fluid to the region 38 cannot escape. This, therefore, causes the outer sleeve 26 to be longitudinally pressed against the packing rings at the retaining nut end of the seal assembly and the interior sleeve 25 to be pressed against packing rings abutting the flange 15. Since the fluid inlet pipe 37 extends through a spacious aperture 38 of tube 14, the fluid inlet pipe 37 is permitted a reasonable latitude of movement with respect to the tube 14. So that the sleeves 25 and 26 maintain a proper operational location within the tube 14, a seal 39 is placed about the outermost surfaces of the sleeve flanges 28 and 33. Obviously, the seals, packing and O-rings of the present invention may be made from any suitable material.

In operation of the present invention the desired fluid is supplied to the pressure region 38 through the inlet pipe 37 thereby expanding the concentric sleeves in opposite directions to maintain pressure against the packing rings 22 located at opposite ends of the operating cavity 24. The most efficient seal will be maintained if the pressure of the inlet fluid is controlled to such a point that the fluid in the reservoir 12 will be maintained therein by action of the pressure seals 22. Yet the shaft 17 has to have generally free rotation.

The embodiment of the invention shown in FIGURES 4 and 5 is essentially the same as disclosed previously except that the concentric sleeves are replaced with an expansible elongated cylindrical hollow walled bellows 51 interconnected to the fluid inlet fluid pipe 37 by means of an adapter fitting 52. In normal practice the bellows 51 is in a relaxed state, but still filling the operating cavity 24. When pressurized fluid is admitted to the interior of the bellows, the expansible nature of it will allow the bellows to expand axially along the shaft 17 in both directions to provide the required pressure against the packing rings 22. To additionally provide an effective seal against the shaft, there is vulcanized to the bellows 51 a pair of brass rings 53. These rings are maintained properly spaced at all times by means of a spacer bushing 54 located around shaft 17 and flanked by the rings 53.

The present invention has disclosed a novel mechanical seal assembly for holding pressures in a stuffing box and preventing leakage therefrom. The present device is highly efficient in operation and is easily manufactured at low cost.

Various modifications may be made in the invention without departing from the spirit and scope thereof, and it is desired, therefore, that only such limitations shall be placed thereon as are imposed by the prior art and are set forth in the appended claims.

What is claimed is:

1. A mechanical seal assembly comprising a fluid reservoir contained within a housing having an opening therein and comprising a tubular member extending outwardly from the housing and surrounding the opening, a shaft being concentrically disposed with and extending through both the opening and the tube, the tube having a free end closed by a packing retaining nut, the packing retaining nut being centrally apertured to receive the shaft therethrough, sealing elements positioned about the shaft adjacent the housing and adjacent the retaining nut to prevent the transfer of fluid from the reservoir along the shaft, adjustable pressure means within the tube and concentric about the shaft adapted to apply controlled pressure to the sealing elements with said adjustable pressure means comprising inner and outer concentrically disposed tubular sleeves adapted to move in opposing directions at predetermined times along the longitudinal centerline of the sleeves to apply pressure to the sealing elements wherein concentric portions of the tubular sleeves have wall surfaces in opposing relation, the outer tubular sleeve having an aperture therethrough in the region of the opposing wall surfaces and fluid pressure supply means mounted in the sleeve wall aperture to supply fluid pressure to the region of opposing wall surfaces.

2. A mechanical seal assembly as defined in claim 1, wherein the opposing wall surfaces of the tubular sleeves each have sealing rings mounted thereto closing an area between the sleeves, the sealing rings extending circumferentially around the wall surfaces and flanking the sleeve wall aperture to thereby define in said area a pressure region whereby when the fluid pressure is admitted to the pressure region through the sleeve wall aperture the resulting force upon the sealing rings causes the inner and outer sleeves to longitudinally extend relative to each other to apply pressure to the respective sealing elements.

3. A mechanical seal assembly as defined in claim 2, wherein the sealing elements comprise annular members having an aperture therein fitted over the shaft.

References Cited

UNITED STATES PATENTS

| 574,353 | 12/1896 | Garlock | 277—59 |
| 632,442 | 9/1899 | Fillmore et al. | 277—34 X |
| 2,731,282 | 1/1956 | McManus et al. | 277—59 X |
| 2,943,874 | 7/1960 | Valdi et al. | 277—34.3 |
| 3,132,867 | 5/1964 | Scaramucci | 277—73 X |
| 3,226,126 | 12/1965 | Plate | 277—34 X |
| 3,337,222 | 8/1967 | Smith et al. | 277—34.3 |

FOREIGN PATENTS

| 650,641 | 2/1951 | Great Britain. |
| 795,689 | 5/1958 | Great Britain. |

SAMUEL ROTHBERG, *Primary Examiner.*

U.S. Cl. X.R.

277—73, 103, 34.3